V. A. FYNN.
POLYPHASE MOTOR.
APPLICATION FILED FEB. 14, 1917.
1,387,046.
Patented Aug. 9, 1921.
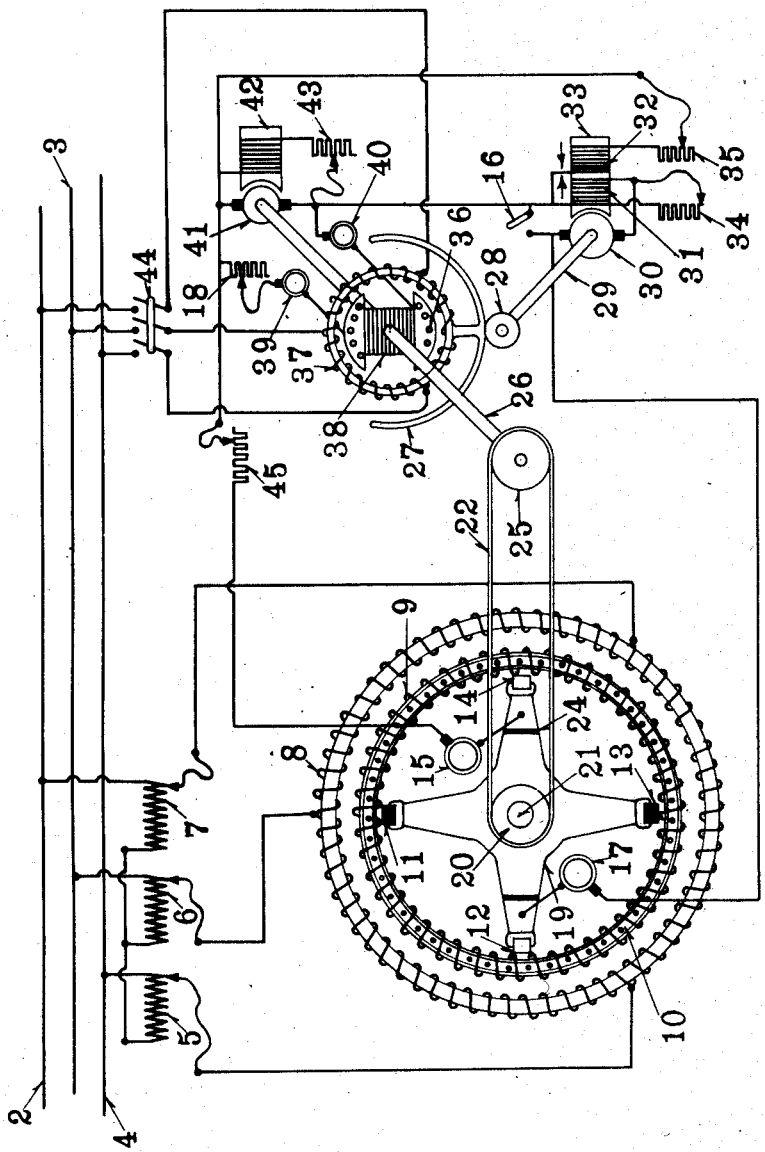
INVENTOR
Valère A. Fynn
BY
E. E. Huffman
ATTORNEY

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

POLYPHASE MOTOR.

1,387,046.   Specification of Letters Patent.   Patented Aug. 9, 1921.

Application filed February 14, 1917. Serial No. 148,511.

*To all whom it may concern:*

Be it known that I, VALÈRE A. FYNN, a subject of the King of England, residing at the city of St. Louis, State of Missouri, United States of America, have invented a certain new and useful Polyphase Motor, of which the following is such a full, clear, and exact description as will enable any one skilled in the art to which it appertains to make and use the same, reference being had to the accompanying drawings, forming part of this specification.

My invention relates to asynchronous polyphase motors of the induction type, its objects being to bring the power factor of such machines under the control of the operator; to increase their efficiency and overload capacity; and to provide more efficient means for starting such motors.

It is known that as soon as the primary or inducing member of a polyphase motor is connected to the mains, a field of nearly constant magnitude and revolving with synchronous speed relatively to the inducing member, is immediately produced, the direction in which this field revolves being determined by the sequence in which the motor terminals are connected to the mains. In case the stator is the inducing or primary, and the rotor the induced or secondary, member, and the latter is provided with a short circuited winding, such as a squirrel cage, it will tend to revolve in the same direction as the nearly constant magnetization produced by the stator, and if not overloaded, will reach a nearly synchronous speed, revolving at almost the same speed as the stator magnetization. If the rotor is the primary, and the stator carries the short circuited winding, then, upon being connected to the mains, the rotor will revolve in a direction opposed to that of the nearly constant revolving field which it sets up and will reach a nearly synchronous speed, with the result that the nearly constant revolving field set up by the primary will become almost stationary in space, moving with respect to the stator at a speed equal to the difference between that of the revolving field produced by the rotor and that of the rotor itself. The rotor cannot reach a synchronous speed in either case, because the speed difference between the revolving field set up by the primary and the secondary member, would then become nil. The secondary conductors would not cut any field, no currents would be induced in them, and no torque could be produced. The synchronous is therefore the limiting speed of such machines.

The power factor of such motors has heretofore been improved or controlled by injecting alternating current E. M. F's. of proper phase into the secondary circuits, thereby changing the phase of the secondary currents, and because of the transformer relation between secondary and primary, also changing the phase of the primary currents with respect to the phase of the terminal voltage. Such machines have also been provided with direct-current excitation, but in such a way as to cause them to lose their asynchronous induction motor characteristics and converting them into synchronous machines.

According to this invention, I propose to compensate an asychronous polyphase motor by means of a direct current introduced into its secondary in such a way as to preserve the asynchronous features of the machine and without preventing the inductive transfer of energy from the primary to the secondary. To this end, I provide the secondary member with a commuted winding and introduce a direct current into this winding by way of brushes driven at synchronous speed with respect to the primary member and in the same direction as the nearly constant field produced by said member, and I so locate these brushes relatively to the axis of each phase of the inducing winding as to make the brush axis always coincide with the axis of one of the primary phases when the terminal voltage of that phase passes zero, or is approximately zero.

By properly adjusting the magnitude of the direct-current introduced into the secondary by means of these compensating brushes, I can entirely eliminate all lagging magnetizing currents from the primary member. By increasing the direct-current excitation beyond this point, I can cause the primary to take leading currents.

In order to make better use of the rotor copper, I dispose other brushes on the commuted winding of the secondary member, short circuit them, and displace them by 90 electrical degrees with respect to the compensating brushes. The short circuited brushes will carry load currents and will be referred to as working brushes.

In the accompanying diagrammatic drawing, the invention is illustrated as applied to a two-pole, three-phase motor with stationary primary and revolving secondary. The stator carries a distributed winding 8 connected at three equidistant points to the mains 2, 3, 4, by way of the adjustable ratio transformers 5, 6, 7. The secondary carries a squirrel-cage winding 10 of ordinary construction, and also a commuted winding 9. Brushes 11, 12, 13, 14, mounted on the brush carrier 19 are adapted to coöperate with the commuted winding 9. The brushes 11, 13 are electrically interconnected through the metal brush carrier 19, and are thus short circuited; the brushes 12, 14 are insulated at 24 from the brush carrier and connected to the slip rings 15, 17. The brush carrier is provided with a pulley 20, and is loosely mounted on the shaft 21 of the motor. The carrier is driven by means of an auxiliary synchronous three-phase motor, the shaft 26 of which carries a pulley 25 connected to the pulley 20 by means of the belt 22. This auxiliary motor has a stationary primary, provided with a winding 37 connected to the mains 2, 3, 4, at three equidistant points by means of the switch 44. Its revolving member is mounted on the shaft 26, has defined polar projections provided with a damping winding 36 and an exciting winding 38 connected to the slip rings 39, 40. A direct-current generator is driven by this auxiliary motor. The field magnet 42 of this generator is stationary; its armature 41 is mounted on the shaft 26 of the auxiliary motor. An adjustable resistance 43, included in the exciting circuit of this generator, permits its terminal voltage to be varied. The terminals of this generator are connected to the exciting winding 38 of the auxiliary motor through the slip rings 39, 40 and brushes coöperating therewith.

The stator of the auxiliary motor may be moved through a certain angle, by means of the worm 28 and the wheel 27. This wheel is integral with or attached to the stator, and the worm is driven by means of an auxiliary direct-current motor as shown, having the shaft 29, armature 30, and field magnet 33. This field magnet is provided with two exciting windings. The winding 32 is connected to the terminals of the direct current generator 41, 42, through the adjustable resistance 35. The exciting winding 31, adapted to produce a magnetization opposed to that due to 32, is connected to the terminals of the direct-current generator 41, 42, in series with the armature 30 of the auxiliary direct-current motor, the commuted winding 9 on the secondary of the main motor, and the regulating resistance 45. The connection to the commuted winding 9 is through the slip ring 17 and the brush coöperating therewith, the brushes 12, 14, and the slip ring 15 and the brush coöperating with same. The regulating resistance 34 is connected across the terminals of the exciting winding 31. The pitch of the worm 28 coöperating with the wheel 27, is so chosen that it is not possible to drive the shaft 29 by exerting a torque on the wheel 27. This arrangement results in holding the stator of the auxiliary polyphase motor in one position, when the auxiliary direct-current motor 30, 33 is not energized. In practice, the slip rings 15, 17 would be mounted on the shaft 21, and the slip rings 39, 40 would be mounted on the shaft 26. A train of gears can be interposed between the worm 28 and the armature 30, for the purpose of reducing the torque to be exerted by the auxiliary direct-current motor in order to move the stator of the auxiliary polyphase motor. The switch 16 short circuits the armature 30 and the field winding 31 of the auxiliary direct-current motor and is closed when it is not desired to move the stator of the auxiliary polyphase motor automatically.

The main motor herein described may be started as follows:

Start the auxiliary polyphase motor by connecting its primary winding 37 to the mains 2, 3, 4, by means of the switch 44. The machine will start and reach a nearly synchronous speed, exerting a powerful torque at starting, because of the short circuited windings or bars 36 embedded in the polar projections of the rotor. With the auxiliary motor running at a nearly synchronous speed, the direct current dynamo 41, 42 will become excited. By closing the circuit of the unidirectional exciting winding 38 of the auxiliary motor over the adjustable resistance 18, this auxiliary motor will be converted into a synchronous machine, the power factor of which can be adjusted by adjusting its direct current excitation. I prefer to operate this machine at unity power factor. The brushes coöperating with the secondary 9 of the main motor will be driven at synchronous speed, the brushes 11, 13 being short circuited and the circuit of the brushes 12, 14 being interrupted at 45. The next step is to connect the primary of the main motor to the mains 2, 3, 4 by means of the adjustable ratio transformers 5, 6, 7; impressing on said primary a fraction of the line voltage, and so connecting the motor to the mains as to cause the nearly constant flux produced by the primary polyphase currents to revolve in the same direction as the brushes 11, 12, 13, 14. The fractional voltage impressed on the primary may or may not be sufficient to start the motor. Whether it is or not, I next prefer to place the axes of the brushes of the main motor in proper relation to the axis of the revolving field produced by its primary. A simple way of achieving this object is to connect a voltmeter to the brushes 12, 14, and so move the stator 37 of the auxiliary polyphase motor that the potential difference between said brushes becomes zero. This will be the case when the axis of the compensating brushes 12, 14 coincide at all times with the axis of the flux due to the primary 8. As it is often difficult to locate a zero point, the brushes 12, 14 can be displaced in the one direction by suitably moving the stator 37 until a certain reading is obtained on the voltmeter, then moving the brushes in the opposite direction until an equal reading is obtained on the voltmeter, and finally placing the brushes midway between these two positions. For a given excitation of the auxiliary polyphase motor, the axis of its revolving member will occupy a certain position relatively to the axis of one of the primary phases of said motor every time that the E. M. F. impressed on that phase reaches a given value, for instance, passes through zero. If the axis of the phase in question is displaced in space by moving the stator while the motor is in operation, then the rotor of this auxiliary motor will go through exactly the same motion this movement being superposed on its synchronous rotation and momentarily accelerating or retarding said rotation. Because the brush gear of which the brushes 12, 14 are a part, is mechanically geared to the revolving member of the auxiliary polyphase motor, these brushes will follow every movement of said rotor, and can, in this way, be placed in any desired position relative to the axis of the revolving field produced by the primary 8. To bring about the adjustment described, the stator 37 can be moved, for instance by rotating the shaft 29 by hand.

With the compensating brushes revolving in line with the axis of the field produced by the primary, no E. M. F. will appear at these brushes. The brushes 11, 13 contact with the commuted winding 9 along an axis displaced by 90 electrical degrees from the axis of the compensating brushes 12, 14 and are therefore always in the axis of the commuted winding 9, along which the maximum potential difference due to a relative movement of this winding and of the stator flux, will appear. Consequently, if the secondary stands still while the primary flux and the brushes revolve in synchronism, then an E. M. F. will appear at the brushes 11, 13, and will cause a current to flow in the commuted winding 9 along the axis 11, 13. Should the rotor begin to revolve in the direction of the revolution of the brushes, then the E. M. F. at the brushes 11, 13, will diminish, becoming zero for a synchronous rotor speed.

Having placed the compensating brushes 12, 14 in line with the revolving flux produced by the primary 8, I impress on said brushes a direct-current E. M. F. which I derive from the generator 41, 42 by closing the circuit of said brushes at 45. If it is desired to operate the machine at unity power factor, then the magnitude of the direct current should be increased until all lagging magnetizing currents are eliminated from the primary 8; in other words, until the revolving flux of the machine is entirely produced by the direct current introduced into the secondary by means of the synchronously rotating brushes 12, 14. During this starting period, it is more convenient to short-circuit the auxiliary direct-current motor by means of the switch 16, for reasons which will be explained later. Having connected the primary 8 to a fraction of the line voltage, correctly located the compensating brushes relatively to the revolving field produced by the primary and having introduced a compensating current into the rotor, it is now necessary to gradually increase the terminal voltage of the motor, increasing, at the same time, the magnitude of the direct current introduced into the secondary, so as to keep the desired power factor throughout the starting period. When the terminal voltage has been sufficiently increased, the rotor of the main motor will begin to revolve and will finally reach a speed near the synchronous. As long as the rotor is at rest any increase in the terminal voltage will increase the lagging component of the rotor current and necessitate an increase of the D. C. voltage if the power factor is to be kept constant. This may be true even after the rotor is in rotation but as the speed of the machine approaches the synchronous the lag in the rotor diminishes and it will as a rule be then necessary to reduce the compensating direct current voltage in order to preserve substantial constancy of the power factor.

During the starting operation—indeed, throughout the operation of the machine—the effect of the working brushes 11, 13 short-circuiting the rotor along an axis displaced by 90 electrical degrees from that of the revolving stator magnetization, is to increase the torque of the machine and to decrease the lag of the working current behind the working E. M. F. in both stator and rotor.

It has been stated that the difference in speed between the revolving flux produced by the primary and the conductors of the secondary, is responsible for the working currents in said secondary. In the squirrel-cage 10 of the secondary, these currents will be alternating, of a periodicity which will change with the speed of the rotor. When the rotor stands still, the frequency of the rotor currents will be the same as the frequency of the line. As the rotor begins to move, this frequency will decrease, being always proportional to the difference between the synchronous and the rotor speed. All possible cases can be covered by stating that the alternating rotor currents will always have slip frequency. But a current will also flow through the short circuit created by the working brushes 11, 13, and this current will be unidirectional, its magnitude varying with the slip. The greater the periodicity of the alternating rotor currents, the greater their lag behind the working E. M. F.'s. The load current, flowing through the working brushes 11, 13, being a direct current, will be in phase with the working E. M. F. in that axis. Both alternating and unidirectional working currents will be faithfully reproduced in the primary, as to phase and magnitude. The resultant working current, in case the brushes 11 and 13 are short-circuited, will not only be of greater magnitude, but will also have a smaller lag than would be the case if the brushes 11, 13 were removed and working rotor currents could only close through the squirrel-cage 10.

After the motor has reached its normal speed and the desired power factor has been secured by properly selecting the magnitude of the direct current sent into the rotor compensating circuit, the switch 16 may be opened, thereby putting the auxiliary direct-current motor 30, 33 into operation. The armature of this motor and its field 31 are connected in series with the compensating brushes of the main motor. The exciting winding 32 is connected in parallel with the direct-current generator 41. The excitation produced by the windings 31, 32 is now so adjusted by means of the regulating resistances 34, 35, as to reduce the magnetization of the auxiliary direct-current motor to zero, when the desired exciting current circulates through the circuit of the compensating brushes 12, 14. Should these brushes now move out of the axis of the revolving field produced by the stator, then an E. M. F. will immediately appear at these brushes due to relative motion between the conductors of the commuted winding 9 and the stator-produced flux. This direct-current E. M. F. will, according to the direction in which the brushes 12, 14 have been moved, be the same in direction as the E. M. F. of the generator 41, 42, or opposed to it, resulting in an increase or decrease of the direct current through the circuit of the brushes 12, 14. This change of current will upset the balance between the exciting windings 31, 32 of the auxiliary direct-current motor and will cause the armature thereof to move in the one or the other direction. This armature is so connected to the stator 37 that its movement will always be in a direction to replace the compensating brushes 12, 14 into the axis of the revolving field produced by the stator 8.

Another way of displacing the compensating brushes 12, 14, or the working brushes 11, 13, is to alter the direct-current excitation of the auxiliary three-phase motor; for such an alteration also brings about a relative motion between the stator and rotor axes of said auxiliary. This means of adjusting the brushes on the main motor is, however, not desirable, for it can only be had at the expense of an alteration in the power factor of the auxiliary motor. For this same reason it is better to keep the power factor of said motor constant during the operation of the main motor.

Since it is desired to have the direct current introduced into the secondary by way of the compensating brushes 12, 14, produce a revolving flux exactly coinciding in direction at every instant with that which would otherwise be produced by the primary 8, then these brushes should be so rotated that their axis coincides with the axis of each of the stator phases in succession—coinciding with each at the time when the terminal voltage of that particular phase is very near zero or goes through zero. Thus, when the voltage at the two points of the primary winding 8 which are connected to the mains 3, 4, goes through zero, then the axis of the brushes 12, 14, should, at that time, be parallel to the line joining those two points. Similarly, when the points connected to the mains 3, 2, are at zero potential, then the axis of the brushes 12, 14 should be parallel to the line joining them, and so on.

While the rotor copper will be best utilized by employing the working brushes 11, 13, yet these need not necessarily be used; phase compensation can be secured without them and with the help of the compensating brushes 12, 14, only. As long as these brushes stand in the correct position, clearly defined in this specification, the power factor control will be entirely independent of the load of the motor.

It will be understood that these improvements can be applied to motors in which the primary revolves and the secondary is stationary. It is only necessary to make provision for revolving the brushes at synchronous speed relatively to the primary and in the same direction as the revolving field produced by that member. When the primary is stationary, as in the figure, then these brushes must be rotated at synchronous speed in the direction in which the rotor revolves. When the secondary is stationary, then these brushes must be revolved at slip speed against the direction of rotation of the primary. By "slip speed" I mean the speed equal to the difference between the synchronous and the rotor speed.

Such novel subject matter as is herein disclosed but not claimed is claimed in my co-pending application, Serial No. 148,512, filed February 14, 1917.

Having fully described my invention, what I claim as new and desire to secure by Letters Patent of the United States is:

1. In an alternating current motor the combination of an inducing member provided with a polyphase winding, an induced member provided with a permanently short-circuited winding and a commuted winding, brushes coöperating with said commuted winding to close the same along an axis per pole pair displaced from the axis of maximum induced potential in the induced member, and means for revolving said brushes at such speed as to cause the relative speed of the brushes and the inducing member to equal the synchronous speed.

2. In an alternating current motor the combination of an inducing member provided with a polyphase winding, an induced member provided with a permanently short-circuited winding and a commuted winding, brushes coöperating with said commuted winding to close the same along an axis per pole pair displaced from the axis of maximum induced potential in the induced member, means for revolving said brushes at such speed as to cause the relative speed of the brushes and the inducing member to equal the synchronous speed, and means for supplying direct current to said brushes.

3. In an alternating current motor the combination of an inducing member provided with a polyphase winding, an induced member provided with a commuted winding and a winding permanently short-circuited along a plurality of axes which are stationary with respect to the induced member, brushes coöperating with said commuted winding to close the same along an axis per pole pair displaced from the axis of maximum induced potential in the induced member, and means for revolving said brushes at such speed as to cause the relative speed of the brushes and the inducing member to equal the synchronous speed.

4. In an alternating current motor the combination of an inducing member provided with a polyphase winding, an induced member provided with a permanently short-circuited winding and a commuted winding, brushes coöperating with said commuted winding to close the same along an axis per pole pair displaced from the axis of maximum induced potential in the induced member, and means for maintaining the axis of said brushes in constant relation to the axis of the revolving field produced by the inducing member.

5. In an alternating current motor the combination of an inducing member provided with a polyphase winding, an induced member provided with a permanently short-circuited winding and a commuted winding, brushes coöperating with the commuted winding to close the same along one axis per pole pair, an auxiliary synchronous motor for revolving the brushes, and a direct current dynamo connected to excite the field of said synchronous motor and to supply direct current to the brushes.

6. In an alternating current motor the combination of a stationary inducing member provided with a polyphase winding, a revolving induced member provided with a permanently short-circuited winding and a commuted winding, brushes coöperating with said commuted winding to close the same along an axis per pole pair displaced from the axis of maximum induced potential in the induced member, and means for revolving said brushes in synchronism with and in the same direction as the revolving field produced by the inducing member.

7. In an alternating current motor the combination of an inducing member provided with a polyphase winding, an induced member provided with a permanently short-circuited winding and a commuted winding, two sets of brushes coöperating with said commuted winding to close same along axes displaced by 90 electrical degrees from each other, and means for revolving said brushes at such speed as to cause the relative speed of the brushes and the inducing member to equal the synchronous speed.

8. In an alternating current motor the combination of an inducing member provided with a polyphase winding, an induced member provided with a permanently short-circuited winding and a commuted winding, brushes coöperating with said commuted winding to close the same along one axis per pole pair, means for maintaining the axis of said brushes in the axis of the revolving field produced by the inducing member, and means for impressing a compensating E. M. F. on said brushes.

9. In an alternating current motor the combination of an inducing member provided with a polyphase winding, an induced member provided with a permanently short-circuited winding and a commuted winding, brushes coöperating with said commuted winding to close the same along one axis per pole pair, and automatic means for maintaining the axis of said brushes in the axis of the revolving field produced by the inducing member.

10. In an alternating current motor the combination of an inducing member provided with a polyphase winding, an induced member provided with a permanently short-circuited winding and a commuted winding, brushes coöperating with said commuted winding to close the same along one axis per pole pair, means for maintaining the axis of said brushes in that axis of the commuted winding in which the induced potential is zero, and means for conductively impressing a direct current E. M. F. on said brushes.

11. In an alternating current motor the combination of an inducing member provided with a polyphase winding, an induced member provided with a permanently short-circuited winding and a commuted winding, two sets of brushes coöperating with said commuted winding to close the same along axes displaced by 90 electrical degrees from each other, means for revolving said brushes in the direction of rotation of the revolving field produced by the inducing member and with the axis of one set of brushes coinciding with the axis of said revolving field.

12. In an alternating current motor the combination of an inducing member provided with a polyphase winding, an induced member provided with a permanently short-circuited winding and a commuted winding, brushes coöperating with said commuted winding to close the same along one axis per pole pair, an auxiliary synchronous motor for revolving the brushes in synchronism with the revolving field produced by the inducing member, and a second auxiliary motor for rotating the stator of the synchronous motor to maintain fixed relation between the axis of the brushes and that of the revolving field.

13. In an alternating current motor the combination of an inducing member provided with a polyphase winding, an induced member provided with a permanently short-circuited winding and a commuted winding, brushes coöperating with the commuted winding to close the same along one axis per pole pair, an auxiliary synchronous motor for revolving the brushes, means for supplying direct current to the brushes, and a second auxiliary motor for rotating the stator of the synchronous motor to maintain fixed relation between the axis of the brushes and that of the revolving field produced by the inducing member.

14. In an alternating current motor the combination of an inducing member provided with a polyphase winding, an induced member provided with a commuted winding, brushes coöperating with said commuted winding to close the same along one axis per pole pair, and means controlled by the current through said brushes for maintaining their axis in constant relation to the axis of the revolving field produced by the inducing member.

15. In an alternating current motor the combination of an inducing member provided with a polyphase winding, an induced member provided with a permanently short-circuited winding and a commuted winding, two sets of brushes coöperating with said commuted winding to close same along axes displaced by 90 electrical degrees from each other, one of said sets of brushes being short-circuited, means for supplying direct current to the other set, and means for revolving said brushes at such speed as to cause the relative speed of the brushes and the inducing member to equal the synchronous speed.

16. The method of starting a polyphase motor having an inducing member and an induced member provided with a permanently short-circuited winding and a commuted winding, brushes coöperating with the commuted winding and means for revolving said brushes, which consists in revolving the brushes at synchronous speed with respect to the inducing member of the motor, impressing less than the normal operating voltage on the inducing member, impressing a direct current voltage on the brushes, increasing the voltage impressed on the inducing member and simultaneously increasing the voltage impressed on the brushes as the lagging component of the current in the induced member increases.

In testimony whereof I have hereunto set my hand and affixed my seal.

VALÈRE A. FYNN. [L. S.]